Feb. 4, 1964  R. E. DIENER ETAL  3,120,133
TRANSMISSION DISCONNECT DEVICES
Filed March 23, 1960  3 Sheets-Sheet 1
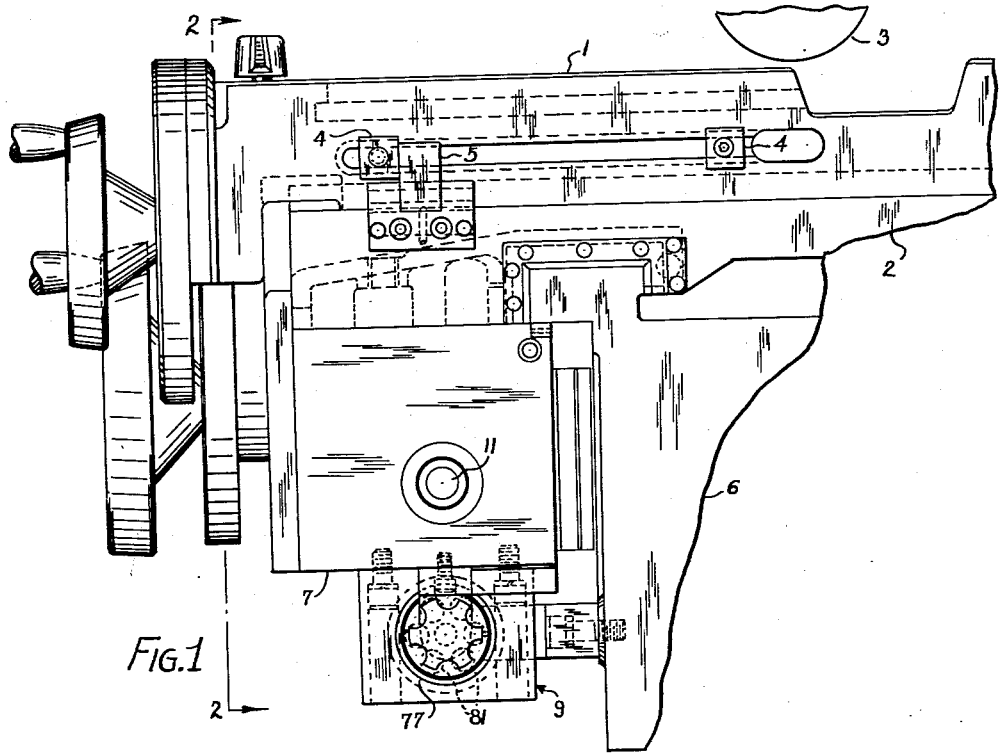
FIG.1
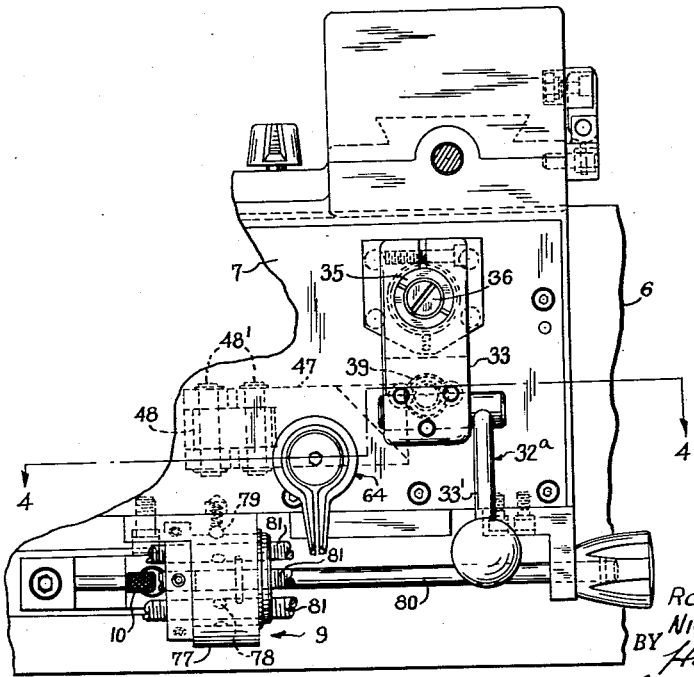
FIG.2
INVENTORS
ROBERT E. DIENER
NICHOLAS P. DARASH
BY
ATTORNEYS

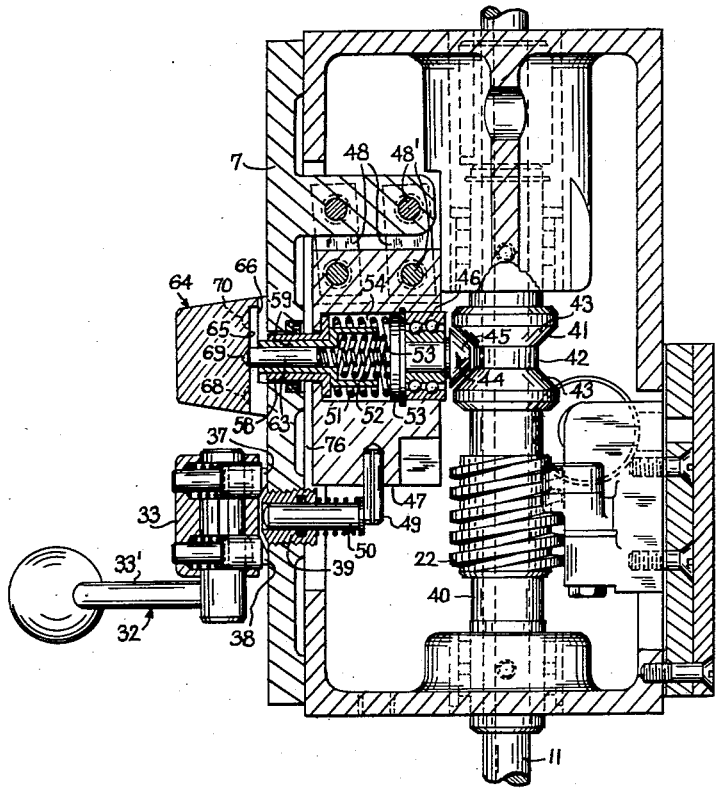
*Fig. 4*
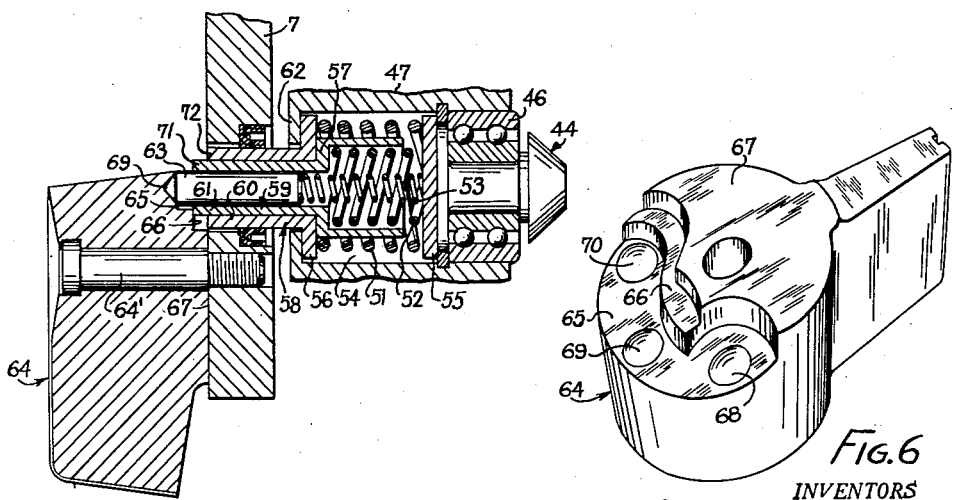
*Fig. 5*  *Fig. 6*
INVENTORS
ROBERT E. DIENER
NICHOLAS P. DARASH
BY Hudson, Boughton,
Williams, David & Hoffman
ATTORNEYS Feb. 4, 1964 R. E. DIENER ETAL 3,120,133
TRANSMISSION DISCONNECT DEVICES
Filed March 23, 1960 3 Sheets-Sheet 3
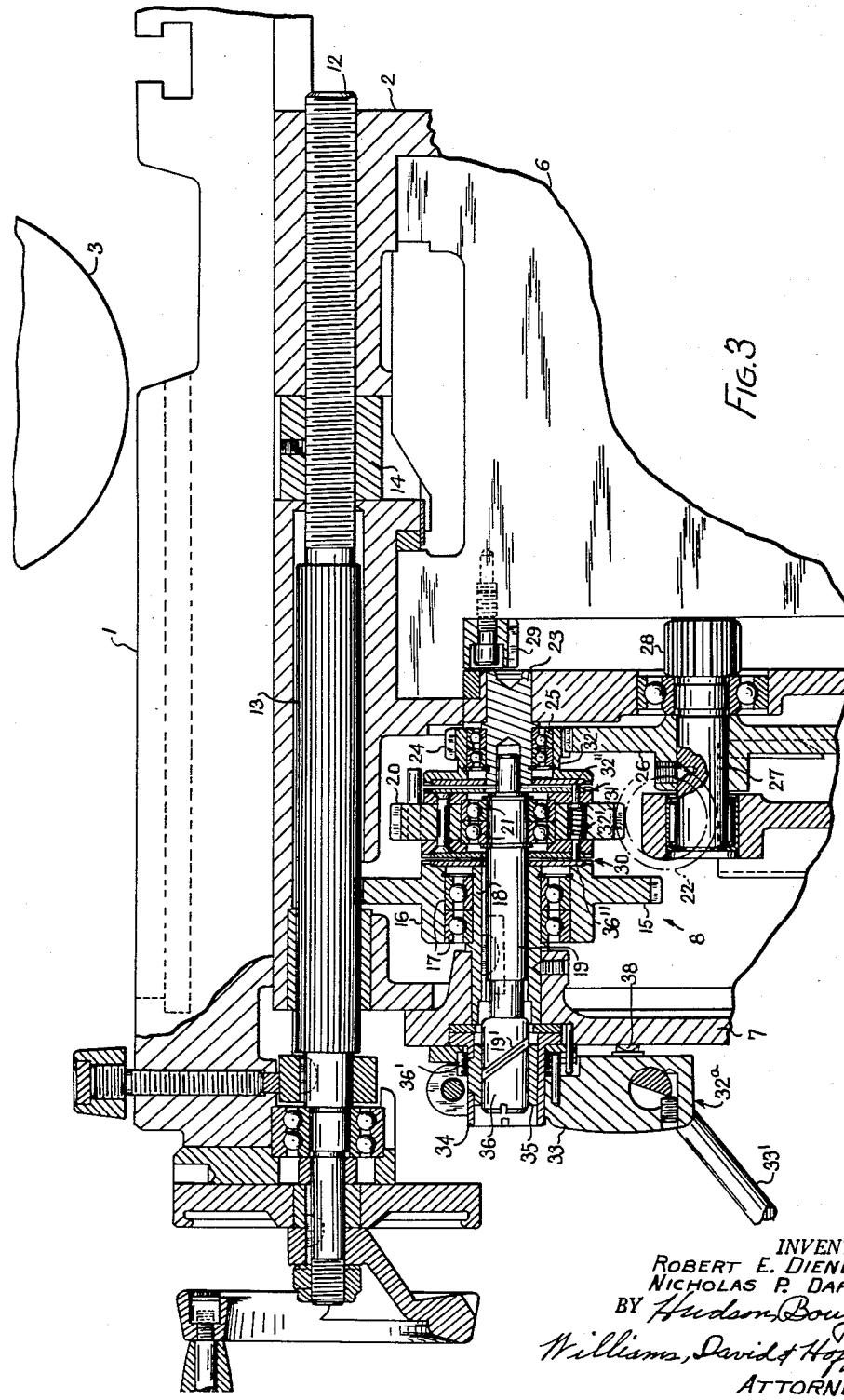
INVENTORS
ROBERT E. DIENER
NICHOLAS P. DARASH
BY Hudson Boughton,
Williams, David & Hoffmann
ATTORNEYS United States Patent Office 3,120,133
Patented Feb. 4, 1964

3,120,133
TRANSMISSION DISCONNECT DEVICES
Robert E. Diener, Shaker Heights, and Nicholas P. Darash, Cleveland, Ohio, assignors to The Warner & Swasey Company, Cleveland, Ohio, a corporation of Ohio
Filed Mar. 23, 1960, Ser. No. 17,153
7 Claims. (Cl. 74—411)

This invention relates to transmission disconnect devices and particularly to means for automatically disconnecting a transmission drive for driving a movable device.

According to the present invention improved means are provided for automatically disconnecting a transmission drive in response to an overload condition encountered by the driven device or engagement of the device with a stop. The disconnect means is arranged in a unique manner so that parts thereof are adjustable to permit variation of the force required to effect disconnection of the transmission.

The transmission includes a worm shaft which meshes with a worm wheel. The worm shaft is mounted for axial movement and is so moved when the worm wheel cannot rotate due to the movable device encountering an overload condition or engaging a stop. Such axial movement of the worm shaft is utilized to effect disconnection of the transmission so that the movable device cannot be driven thereby. In the present invention a novel arrangement is provided which permits adjustment of the force required to effect the axial movement of the worm shaft necessary to disconnect the drive so that the disconnection of the transmission is controllable over a wide range.

The worm shaft is restrained against axial movement by resilient means positioned to act on the worm shaft in a direction extending generally radially of the worm shaft axis. The resilient means preferably comprises a plurality of coil springs mounted so that the restraining force exerted thereby on the worm shaft is readily adjustable by actuation of an adjusting member. In the preferred embodiment the springs function to resist movement of a cam follower out of engagement with a cam on the worm shaft which when moved axially against the spring restraining force effects radial displacement of the follower to effect the disconnecting operation.

The invention may be employed in connection with a machine tool wherein a tool-supporting slide is movable by a transmission driven from a rotatable feed shaft. The transmission is disconnected automatically when the movable slide engages a stop or when the slide encounters an overload condition such as may result when a tool on the slide is performing a deep cut on a workpiece.

It is therefore an object of the invention to provide improved means for automatically disconnecting a transmission for a movable device in response to the device encountering an overload condition or engaging a stop.

It is another object of the invention to provide means as defined in the preceding object including parts which are adjustable to vary the force required to disconnect the transmission.

It is another object of the invention to provide improved means for automatically disconnecting the transmission for a movable device including a worm shaft which is axially movable against the restraining action of resilient means which act in a direction extending generally radially of the worm shaft.

It is a still further object of the invention to provide means as defined in the preceding object wherein the resilient means comprise a plurality of springs which are adjustable to vary the restraining force exerted thereby on the worm shaft.

Other objects of the invention will become apparent when taken in conjunction with the accompanying drawings in which FIG. 1 is a view in end elevation with parts broken away and with parts removed of a portion of a machine tool embodying the teachings of the invention;

FIG. 2 is a view taken along the line 2—2 of FIG. 1 with parts broken away;

FIG. 3 is a developed view with parts shown in section of the tool portion shown in FIG. 2;

FIG. 4 is a view in section taken generally along the line 4—4 of FIG. 2 with parts removed showing a portion of the transmission and the disconnect device of the machine tool;

FIG. 5 is an enlarged view in section of a portion of the disconnect device shown in FIG. 4; and FIG. 6 is a view in perspective of a part shown in FIG. 5.

Although the invention is susceptible of various applications, modifications and arrangements, it is particularly suitable for employment in connection with a machine tool wherein a movable tool-supporting slide is driven from a transmission.

Referring now to the drawings, there is illustrated in FIG. 1 a portion of a machine tool of the type having a movable tool-carrying slide 1 which is supported by a carriage 2 for movement relative to the carriage in a direction generally perpendicular to the axis of a spindle 3. The slide 1 supports conventional spaced adjustable stops 4 which are engageable with a fixed stop 5 secured to the carriage 2 to limit the amount of movement thereof. The carriage 2 is supported on front and rear parallel ways on the bed 6 of the machine for movement in directions extending generally parallel to the axis of the spindle to carry the slide in such directions.

The carriage 2 has secured thereto an apron 7 which mounts a transmission system represented generally by the numeral 8 for effecting movement of the slide 1 both longitudinally of the spindle and transversely thereof. The apron has secured thereto at its lower end stop means 9 which is movable with the carriage in the longitudinal directions to engage a fixed stop 10 shown in FIG. 2 for limiting the longitudinal movement of the carriage.

Referring now to FIG. 4, there is illustrated a feed shaft 11 which is journalled by spaced parts of the apron for rotation about a generally horizontal axis as viewed in FIG. 1 and which extends through the apron 7 to effect operation of the transmission. The feed shaft 11 is conventionally driven from the spindle through a transmission (not shown) such that the feed shaft rotates at a speed which is proportional to the speed of rotation of the spindle.

The slide is moved in response to rotation of a lead screw 12 (FIG. 3) which is rotatably secured to the slide. As shown in FIG. 3, the screw 12 is formed with an intermediate portion 13 having gear teeth and is rotated from the transmission as will presently appear. The lead screw 12 extends through a threaded nut 14 which is fixed to the carriage against rotation and against axial movement. The gear teeth on the portion 13 mesh with teeth of a gear 15 formed on a body 16 which is rotatable through bearings 17 relative to a bushing 18 which surrounds and which is keyed to a shaft 19. The bushing 18 is secured to the apron so that the shaft 19 cannot rotate but may be moved axially relative to the bushing 18.

A worm wheel 20 is mounted by the shaft 19 for rotation relative thereto by bearings 21 and is in meshing engagement with a worm 22 rotatable in response to rotation of the feed shaft 11 as will appear hereinafter. A bushing 23 secured to the apron carries a gear 24 which is rotatable relative to the bushing 23 by bearing means 25. The gear 24 meshes with a gear 26 which is fixed to a shaft 27 journalled for rotation by spaced sections of the apron. The shaft 27 carries at its right hand end as viewed in FIG. 3 a gear 28 which meshes with a rack 29 secured to the bed 6. Since FIG. 3 is a developed view, the gear 28 is shown spaced vertically from the rack 29.

The worm wheel 20 carries at its opposite sides portions of a pair of clutches 30 and 31 having cooperating portions carried respectively by the body 16 and by a body 32 on which the gear 24 is formed. As stated previously, the shaft 19 is axially movable and when so moved carries the worm wheel 20 therewith into clutching engagement either with the body 16 or with the body 32, depending upon the direction of axial movement of the shaft 19. When the shaft 19 is displaced to the left as viewed in FIG. 3, the worm wheel will be drivingly connected to the gear 15 through the clutch 30 so that rotation of the worm wheel will impart rotation to the gear 15 and to the lead screw 12 to effect movement of the slide in a direction generally perpendicular to the spindle. When the shaft 19 is displaced to the right as viewed in FIG. 3, the worm wheel will be drivingly connected to the gear 24 through the clutch 31 so that rotation of the worm wheel will effect rotation of the gear 24 to effect longitudinal movement of the carriage and the slide with respect to the spindle.

The shaft 19 is urged to its neutral position by means which include a plurality of springs 32′, only one of which is shown, spaced angularly about the axis of the shaft 19. These springs are within cavities formed in the worm wheel 20 and bias slidably mounted plungers 32″ into engagement with the clutch parts on the bodies 16 and 32.

In order to effect axial movement of the shaft 19 there is provided a selector device 32a which includes a body 33 operatively connected to the shaft 19 and a handle 33′ secured to and projecting from the body 33. As best shown in FIG. 3, the body 33 has attached thereto a sleeve 34 which carries a threaded nut 35 through which extends an end 36 of the shaft 19 having a steep pitch thread 19′ formed thereon. A spiral torsion spring 36′ is connected between the body 33 and the sleeve 34. When the body 33 is rotated from its neutral position shown in FIG. 3 about the axis of the shaft 19 relative to the shaft 19 the spring 36′ will be wound or unwound and the shaft will be displaced axially from its illustrated neutral position against the action of the springs 32′ in a direction dependent upon the direction of rotation of the selector device. It is thus observed that when the selector device is rotated in one direction the shaft 19 will be displaced axially in one direction to effect movement of the slide transversely of the spindle and that when the selector device is rotated in the opposite direction the shaft 19 will be displaced axially in the opposite direction to effect movement of the slide in the longitudinal direction.

A detent arrangement is employed for locking the selector device in its operative positions. For this purpose the body 33 carries a pair of spring biased plungers 37 and 38 (FIG. 4) which are arranged to extend into a bore formed in a bushing 39 secured to a wall of the apron. As will appear hereinafter, the disconnect device operates to eject either of the locking plungers from the cavity of the bushing 39 in order to effect the transmission disconnect operation. When the locking plunger is so ejected the selector device will be rotated to its neutral position by movement of the shaft 19 to its neutral position under the action of the springs 32′ and the spring 36′.

As best shown in FIG. 4, the feed shaft 11 is journalled in spaced end portions of the apron and extends through a longitudinal bore of a worm shaft 40 which carries the worm 22. The worm shaft is keyed to the feed shaft so as to be rotatable therewith and is also mounted so as to be movable axially with respect to the feed shaft. When the feed shaft is rotated the worm shaft and the worm rotate therewith to effect rotation of the worm wheel 20. When the slide 1 encounters an overload condition or when the stops 5 or 10 are engaged by the stops 4 or 9, the worm wheel 20 will stop rotating and will cause the rotating worm 22 and the worm shaft to be displaced axially. This axial displacement of the worm shaft is employed to effect the disconnection of the transmission so that the slide cannot be driven thereby.

As shown in FIG. 4 the disconnect means includes in part a cam 41 carried by the worm shaft 40 so as to be axially displaceable therewith. The cam 41 is shown as comprising a spool secured to the worm shaft and having a circumferential generally V-shaped groove 42 having outwardly flaring sides 43. The cam 41 cooperates with a follower 44 shown in the form of a roller having the configuration of a truncated cone with a peripheral surface 45 configured to fit within the groove 42 and engage the flared sides 43.

The follower 44 is rotatably mounted by a bearing assembly 46 secured to a block 47 which is mounted by a pair of spaced links 48 each pivotally secured to a portion of the apron and to the block 47 by pins 48′. The links 48 form a parallelogram linkage which permit longitudinal movement of the block 47 in a direction radially of the worm shaft as viewed in FIG. 4. The block 47 carries a pin 49 adapted to engage a spring biased plunger 50 slidable within the bore of the bushing 39. The plunger 50 is arranged to eject one of the plungers 37 and 38 from the bore of bushing 39 when the plunger 50 is moved in response to predetermined radial movement of the block 47.

The worm shaft is restrained against axial movement by resilient means which operate in directions extending generally radially of the worm shaft to resist movement of the follower 44 out of the groove 42 formed in the spool 41. The resilient means preferably comprise a plurality of coaxially arranged coil springs and in the embodiment shown there are three coil springs 51, 52 and 53 which are coaxially arranged within a cavity 54 of the block 47. The right hand ends of the springs as viewed in FIG. 4 engage a retaining ring 55 which is secured to the bearing assembly 46. The left hand ends of the springs 51 and 52 engage respectively flanges 56 and 57 of a pair of coaxially arranged plungers 58 and 59 which are slidably mounted one within the other and which have hollow tubular extensions 60 and 61 projecting through an opening formed in a side wall of the apron. The flange 56 of the plunger 58 is adapted to engage the inner surface of an end wall 62 of the block 47, and the flange 57 of plunger 59 is adapted to engage the flange 56. The left hand end of the spring 53 engages an end of a plunger 63 slidable within the extension 61 of the plunger 59.

The plungers 58, 59 and 63 are arranged to engage at their left hand ends a rotary selector knob 64 which is rotatable about the shank of a screw 64′ secured to the apron and which is effective when rotated to vary the force which restrains the worm shaft against axial movement.

The knob 64 is best shown in FIG. 6 and includes a plurality of surfaces 65, 66 and 67 arranged in stepped formation. The surface 65 is formed with a plurality of angularly spaced recesses 68, 69 and 70 adapted to receive the outer end of the plunger 63 to retain the knob 64 in any one of its three selected positions.

When the knob 64 is in the position illustrated in FIG. 5, the surface 67 abuts the apron and the plunger 63 is in the recess 69. In addition, the end 71 of the plunger 59 lightly engages or is slightly spaced from the surface 66 whereas the end 72 of the plunger 58 is spaced from the surface 67 and is substantially at the level of the surface 67. The springs 51, 52 and 53 are free from compression for the conditions illustrated in FIGS. 4 and 5 when the follower 44 is fully within the groove 42. If the follower 44 and the block 47 are displaced toward the left, the springs 52 and 53 will be compressed since the associated plungers 59 and 63 engages surfaces of the knob 64 and cannot move toward the left. However, the spring 51 is not compressed because the plunger 58 is free to move with the block 47 toward the left. Therefore, when the knob 64 is positioned as shown in FIG. 5 the springs 52 and 53 will be compressed when the follower 44 is moved to the left and a first intermediate force resists such movement of the follower 44.

If it is desired to change this force, for example to reduce the force to a minimum value, the knob 64 is rotated in a counterclockwise direction as viewed from the left hand of FIG. 5, from its illustrated position until the plunger 63 is extended into the recess 68. For this condition the end 71 of the plunger 59 is spaced from the surface 66 and is substantially at the level of the surface 66, and the end 72 of the plunger 58 is spaced from the surface 67 substantially at the level of the surface 67. Consequently, when the follower 44 is moved to the left, only the spring 53 is compressed since the plungers 58 and 59 are both free to move to the left with the block 47 toward the surface 65 and the springs 51 and 52 are therefore not compressed.

To increase the force to a maximum value the knob 64 is rotated in a clockwise direction as viewed from the left hand end of FIG. 5 from its illustrated position until the plunger 63 is extended into the recess 70. For this condition the end 71 of the plunger 59 lightly engages the surface 66 and the end 72 of the plunger 58 lightly engages the surface 67. When the follower 44 and the block 47 are moved to the left all of the springs 51, 52 and 53 will be compressed since the associated plungers bear against surfaces of the knob 64 and cannot move to the left.

The operation of the device may now be described. Let it be assumed that the selector device 32a has been rotated to a position to effect axial movement of the shaft 19 to the left as viewed in FIG. 3 so that the worm wheel 20 is drivingly connected to the gear 15 through the clutch 30. With this assumption the slide 1 is moved transversely of the spindle in response to rotation of the worm wheel. When the slide is moved sufficiently so that one of the stops 4 engages the stop 5, or if the slide is prevented from moving for some other reason, rotation of the worm wheel 20 will be prevented and when this occurs continued rotation of the worm 22 results in axial movement of the worm shaft and the cam spool 41 secured thereto.

When the cam spool is so moved the sides 43 thereof will effect displacement of the follower 44 radially of the worm shaft toward the left as viewed in FIG. 4 against the action of one or more of the springs 51, 52 and 53 depending on the position of the knob 64. Since the follower 44 is secured to the block 47 the block will also move radially of the worm shaft and the pin 49 carried by the block at its lower end as viewed in FIG. 4 will move into engagement with the spring biased plunger 50 which is slidably mounted within the bore formed in the bushing 39. The plunger 50 is sufficiently elongated so that movement imparted thereto in response to preselected axial movement of the cam spool 41 results in engagement of the plunger 50 with one of the plungers 37 and 38 to eject such plunger outwardly of the bore in the bushing 39. When this occurs the body 33 is freed for rotation and is rotated through the agency of the thread 19' and the nut 35 in response to movement of the shaft 19 back to its neutral position under the action of the springs 32' of the spring 36'.

Movement of the block 47 to the left as viewed in FIG. 4 is limited by a wall 76 of the apron which is engaged by the block 47 prior to complete ejection of the follower 44 from the groove 42.

The provision of the adjustable spring force arrangement afforded by the rotatable knob 64 and the springs 51, 52 and 53 permits variation of the force required to effect the disconnect operation. For example, if it is desired that the transmission be disconnected in response to the application of a relatively small force to the worm shaft in the axial direction then the minimum restraining force exerted by the springs 51, 52 and 53 may be provided by rotating the knob 57 to the position wherein the plunger 63 is extended into the recess 68. However, if it is desired that the disconnect operation be performed only in response to the application of a relatively large force to the worm shaft then the maximum restraining force exerted by the springs may be provided by rotation of the knob 57 to the position wherein the plunger 63 is extended into the recess 70.

As previously stated, the apron carries stop means 9 to engage a fixed stop 10 when the slide and carriage are moved longitudinally. As best shown in FIGS. 1 and 2 the stop means 9 is in the form of a rotatable drum 77 having a plurality of angularly spaced peripheral notches 78 which cooperate with a spring pressed detent 79 extending downwardly from the apron. The drum is rotated by effecting rotation of a shaft 80 secured thereto and journaled by a portion of the carriage. The drum carries a plurality of threaded shafts 81 which are spaced angularly about the axis of the drum and which extend parallel to such axis. These shafts are arranged to engage the stop 10 which may be secured to the bed 6 of the machine tool. The shafts 81 are threaded into threaded bores of the drum to permit adjustment of the limit of longitudinal movement of the carriage. By rotation of the shaft 80 a selected one of the shafts 81 may be brought into position for engagement with the stop 10 to effect the stopping function.

Although the invention has been described with reference to certain specific embodiments thereof numerous modifications are possible and it is desired to cover all modifications falling within the scope of the appended claims.

Having described our invention, we claim:

1. A drive for moving a movable member comprising, a driven shaft member, means operatively connecting said driven shaft member to said movable member to move said movable member upon rotation of said driven shaft member, a driving shaft member, a connectable and disconnectable torque transmitting means operatively connected to said driven and driving shaft members and connectable to transmit torque between said shaft members and disconnectable to stop the transmission of torque between said shaft members, actuatable means operatively connected to said torque transmitting means and operable to connect and disconnect said torque transmitting means, means mounting one of said shaft members for axial movement, resilient means resisting axial movement of said one of said shaft members in said axial direction including spring means acting in a direction generally radially of said one of said shaft members to resist axial movement of said one of said shaft members and adjusting means operatively connected to said spring means to adjust said spring means to vary the resistance thereof to axial movement of said one of said shaft members and including a part exposed for manual actuation by an operator, and means operatively cooperating with said actuating means and operable in response to predetermined axial movement of said one of said shaft members to operate said actuating means to disconnect said torque transmitting means.

2. A drive for moving a movable member as defined in claim 1 wherein said connectable and disconnectable torque transmitting means includes a clutch means having input and output clutch members which are connected to transmit torque therebetween and disconnected to stop the transmission of torque therebetween, said output clutch member being operatively connected to said driven shaft member to rotate said driven shaft member upon rotation of said output clutch member, and means drivingly connecting said input clutch member to said driving shaft member including a worm wheel connected to said input clutch member and a worm gear meshing with said worm wheel and mounted on said driving shaft member for rotation therewith.

3. A drive for moving a movable member as defined in claim 1 wherein said spring means includes a plurality of coaxial coil springs and said adjusting means includes a plurality of coaxial and slidably mounted plungers extending generally parallel to said springs and each engaging a separate one of said springs, and a rotary selector member effective when rotated to slide a selected one of said plungers to vary the spring force applied by said springs.

4. A drive for moving a movable member comprising, a driven shaft member, means operatively connecting said driven shaft member to said movable member to move said movable member upon rotation of said driven shaft member, a driving shaft member, a connectable and disconnectable torque transmitting means operatively connected to said driven and driving shaft members and connectable to transmit torque between said shaft members and disconnectable to stop the transmission of torque between said shaft members, actuatable means operatively connected to said torque transmitting means and operable to connect and disconnect said torque transmitting means, means mounting said driving shaft member for axial movement, a cam supported on said driving shaft member and axially movable therewith, a cam follower engageable with said cam and movable in a direction generally radially of said driving shaft by said cam in response to axial movement of said driving shaft, a plurality of coaxial coil springs acting generally radially of said driving shaft and yieldably opposing radial movement of said follower by said cam, a plurality of coaxial and slidably mounted plungers extending parallel to said springs each engaging a separate one of said springs, a rotary selector member effective when rotated to slide a selected one of said plungers to vary the spring force yieldably opposing movement of said follower by said cam, and means operable in response to predetermined radial movement of said follower to operate said actuating means to disconnect said torque transmitting means.

5. A drive for moving a movable member as defined in claim 4 wherin said cam is a sleeve member encircling said driving shaft member and has a circumferential generally V-shaped groove therein, and said follower has the configuration of a truncated cone fitting within said groove.

6. A drive for moving a movable member as defined in claim 4 wherein said driving shaft member has an axial opening therein and a feed shaft extends into said opening, said driving shaft member being supported on said feed shaft for rotation therewith and for axial movement relative thereto.

7. A drive of the character described comprising, an axially movable rotatable drive shaft, a cam on said drive shaft movable axially therewith, a cam follower engageable with said cam and movable in a direction generally radially of said shaft by said cam in response to axial movement of said shaft, a plurality of coaxial coil springs acting generally radially of said shaft and yieldably opposing movement of said follower by said cam, a plurality of coaxial and slidably mounted plungers extending generally parallel to said springs and each engaging a separate one of said springs, and a rotary selector member operatively cooperating with a selected one of said plungers and effective when rotated to slide said selected one of said plungers to vary the spring force yieldably opposing movement of said follower.

References Cited in the file of this patent

UNITED STATES PATENTS

| | | |
|---|---|---|
| 1,831,547 | Scholl | Nov. 10, 1931 |
| 2,073,967 | Kiefer | Mar. 16, 1937 |
| 2,086,798 | Greenberg | July 13, 1937 |
| 2,402,273 | Bogart | June 18, 1946 |
| 2,885,901 | Firth | May 12, 1959 |